US010774735B2

(12) United States Patent
Tang et al.

(10) Patent No.: US 10,774,735 B2
(45) Date of Patent: Sep. 15, 2020

(54) ROTARY ENGINE AND POWER OUTPUT METHOD

(71) Applicant: Yihong Tang, Nanchong, Sichuan (CN)

(72) Inventors: Yihong Tang, Sichuan (CN); Li Tang, Sichuan (CN); Jing Tang, Sichuan (CN)

(73) Assignee: Yihong Tang, Nanchong, Sichuan (CN)

( * ) Notice: Subject to any disclaimer, the term of this patent is extended or adjusted under 35 U.S.C. 154(b) by 23 days.

(21) Appl. No.: 16/326,231

(22) PCT Filed: Aug. 15, 2017

(86) PCT No.: PCT/CN2017/097558
§ 371 (c)(1),
(2) Date: Feb. 18, 2019

(87) PCT Pub. No.: WO2018/033080
PCT Pub. Date: Feb. 22, 2018

(65) Prior Publication Data
US 2019/0211745 A1 Jul. 11, 2019

(30) Foreign Application Priority Data

Aug. 19, 2016 (CN) .......................... 2016 1 0685509
Mar. 21, 2017 (CN) .......................... 2017 1 0171843

(51) Int. Cl.
*F02B 53/04* (2006.01)
*F02B 55/00* (2006.01)
(Continued)

(52) U.S. Cl.
CPC ................ *F02B 55/02* (2013.01); *F01C 1/00* (2013.01); *F01C 21/0809* (2013.01);
(Continued)

(58) Field of Classification Search
CPC .......... F02B 53/04; F02B 55/00; F02B 55/02; F02B 55/08; F01C 1/00; F01C 1/344; F01C 1/356; F01C 21/0809
See application file for complete search history.

(56) References Cited

U.S. PATENT DOCUMENTS 3,640,648 A * 2/1972 Odawara ............. F01C 21/0809
418/133
3,855,977 A * 12/1974 Statkus ................. F01B 13/068
123/43 C
(Continued)

FOREIGN PATENT DOCUMENTS

CA 2806083 A1 7/2013
CN 101000016 A 7/2007
(Continued)

OTHER PUBLICATIONS

Chinese Patent Office, English Translation of Search Report of CN201710171843.1, 1 page.
(Continued)

*Primary Examiner* — Audrey K Bradley
(74) *Attorney, Agent, or Firm* — Berggren LLP

(57) ABSTRACT

A rotary engine is provided, comprising a stator and a rotor rotatably connected thereto. A stator holder with an annular recessed variable track guide groove is on each end of the stator. A sidewall, close to the rotor, of the stator is provided with an arc-shaped combustible gas groove, a combustible gas inlet, a ring-shape groove, a combustion chamber, a decompression device and an exhaust gas outlet. A compression-resistant element is provided in the ring-shape groove. The rotor is provided with a combustible gas piston chamber having a combustible gas piston, a slider slot having slider, and gas exchange channels. The sliders on the same generating line on the rotor and the combustible gas piston are connected fixedly to the same sliding rod in a
(Continued)

sliding rod groove, and the two ends of the sliding rod extend into the annular recessed variable track guide groove of the corresponding stator holder.

16 Claims, 7 Drawing Sheets

(51) Int. Cl.
    *F02B 55/02*     (2006.01)
    *F02B 55/08*     (2006.01)
    *F01C 1/00*     (2006.01)
    *F01C 21/08*     (2006.01)
    *F02B 77/14*     (2006.01)

(52) U.S. Cl.
    CPC .............. *F02B 53/04* (2013.01); *F02B 55/00* (2013.01); *F02B 55/08* (2013.01); *F02B 77/14* (2013.01); *Y02T 10/17* (2013.01)

(56) References Cited

U.S. PATENT DOCUMENTS

| | | | |
|---|---|---|---|
| 3,977,369 A | | 8/1976 | Spark et al. |
| 4,072,132 A | * | 2/1978 | Lindros ............... F01C 1/44 123/205 |
| 2014/0352654 A1 | * | 12/2014 | Saba ............... F01C 21/0809 123/200 |

FOREIGN PATENT DOCUMENTS

| | | |
|---|---|---|
| CN | 101832153 A | 9/2010 |
| CN | 101852094 A | 10/2010 |
| CN | 103097661 A | 5/2013 |
| CN | 104265374 A | 1/2015 |
| CN | 104454155 A | 3/2015 |
| CN | 106089411 A | 11/2016 |
| CN | 106930826 A | 7/2017 |
| RU | 2564175 C1 | 9/2015 |

OTHER PUBLICATIONS

International Search Authority, English Translation of International Search Report of PCT/CN2017/097558, 2 pages.

* cited by examiner

US 10,774,735 B2

ROTARY ENGINE AND POWER OUTPUT METHOD

CROSS-REFERENCE TO RELATED APPLICATIONS

Priority

This application is a U.S national application of the international application number PCT/CN2017/097558 filed on 15 Aug. 2017, which claims priority of Chinese patent application CN201610685509.3 filed on Aug. 19, 2016 and CN201710171843.1 filed on Mar. 21, 2017, the contents of all of which are incorporated herein by reference.

TECHNICAL FIELD

The present disclosure relates to the technical field of engines, particularly to a rotary engine.

BACKGROUND ART

The engine is a power machine capable of converting other forms of energy into mechanical energy, including e.g. internal combustion engine. The internal combustion engine, a typical engine, is a heat engine in which a fuel is combusted inside the machine and thermal energy emitted thereby is directly converted to power. Among common internal combustion engines, piston internal combustion engines are the most prevalent. In the piston internal combustion engine, due to reciprocation of a piston, the piston generates a reciprocating inertia force and an inertia moment, and the above inertia force and inertia moment are quite unbalanced, accompanied with the defect of having great noise in operation. In the piston internal combustion engine, inertial rotation is realized by a flywheel, but the flywheel still cannot solve the above problem of non-uniform torque output, thus resulting in ineffective power conversion, all of which seriously restrict an operation speed thereof.

SUMMARY

An object of the present disclosure is to provide a rotary engine, so as to solve the technical problem of non-uniform torsion output existing in engines in the prior art.

Based on the above object, the present disclosure provides a rotary engine, including: a stator, a rotor, and sliding assemblies, wherein the stator is in a tubular shape, the rotor is in a cylindrical shape, the rotor is inserted and mounted inside the stator, the rotor is rotationally connected to the stator, and the sliding assemblies are inserted and mounted on the rotor; the stator is provided with stator holders, a ring-shape groove (circular groove), a compression-resistant element, a combustion chamber, a decompression device, an arc-shape combustible gas groove, a combustible gas inlet, and an exhaust gas outlet; two ends of the stator are each fixedly connected with one stator holder, each stator holder is provided with an annular recessed variable track guide groove, each annular recessed variable track guide groove extends in a closed eccentric annular shape; the annular recessed variable track guide grooves of the two stator holders are parallel and opposite to each other; the ring-shape groove is provided on an inner side wall of the stator, and the ring-shape groove is a groove in a closed ring shape parallel to a cross section of the stator; the compression-resistant element is a block, the compression-resistant element is fixedly connected inside the ring-shape groove, and the compression-resistant element is rotationally connected to the rotor; the combustion chamber is provided at the inner side wall of the stator, and intersects the ring-shape groove at one side of the compression-resistant element; the arc-shape combustible gas groove is a groove in a shape of a section of minor arc; the arc-shape combustible gas groove is arranged parallel to the ring-shape groove, located on the inner side wall of the stator between the ring-shape groove and one of the stator holders, and located at the other side of the compression-resistant element away from the combustion chamber; the combustible gas inlet communicates with the arc-shape combustible gas groove, and is provided on the side wall of the stator at a groove bottom of the arc-shape combustible gas groove; the exhaust gas outlet is provided on the side wall of the stator, and communicates with the ring-shape groove; the rotor is provided with slider slots, combustible gas piston chambers, and sliding rod slots; the sliding rod slots are strip-shape slots which run through two ends of the rotor and are arranged close to a central axis of the rotor; all of the slider slots and the combustible gas piston chambers are located outside the sliding rod slots and communicate with the sliding rod slots; the slider slots are aligned with the ring-shape groove; when the rotor rotates, the combustible gas piston chambers rotate therewith, and the combustible gas piston chambers are able to communicate with the arc-shape combustible gas groove and the combustion chamber; the rotor further includes gas exchange channels, and each gas exchange channel extends from a bottom of the respective sliding rod slot to and runs through an outer wall of the rotor at a position where the gas exchange channel communicates with the ring-shape groove; each of the sliding assemblies includes a slider, a combustible gas piston and a sliding rod; the slider is slidably connected inside the respective slider slot, the combustible gas piston is slidably connected inside the respective combustible gas piston chamber, and the sliding rod is slidably connected inside the respective sliding rod slot; the slider and the combustible gas piston are both in a flat shape, and the slider and the combustible gas piston are provided perpendicular to each other, and both are fixedly connected on the sliding rod; two ends of the sliding rod respectively extend into the annular recessed variable track guide grooves at corresponding ends, and two ends of the sliding rod slide along the annular recessed variable track guide grooves.

Further, each stator holder is provided with an axle hole, two ends of the rotor are each provided with a rotor shaft, and each rotor shaft is rotationally connected with the axle hole on the corresponding stator holder.

The rotary engine provided in the present disclosure includes the stator, the rotor and the sliding assemblies, wherein the stator is fixed relative to a rack, the rotor rotates inside the stator, and the sliding assemblies slide on the rotor. Since the stator is rotationally connected with the rotor, all grooves on the stator corresponding to the rotor form channel(s). The sliding assemblies are utilized to work, that is, the sliding assemblies slide inside the rotor, in the meantime, the sliding assemblies rotate along with the rotor. The inner side wall of the stator is provided with the ring-shape groove parallel to the cross section of the stator and located in a middle portion of the stator. In working, the sliders are inserted into the ring-shape groove. The compression-resistant element is fixedly connected inside the ring-shape groove, to cut off the groove originally in closed ring shape. The slider in each sliding assembly, when rotating to the position of the compression-resistant element, abuts against the compression-resistant element, and is rotationally connected with the compression-resistant element. The ring-shape groove is a channel for combustible gas, the compression-resistant element provided thereon is rotationally connected with the rotor to block a gas pressure, and the combustion-generated gas pressure can only pass through the exhaust gas outlet and be discharged through the ring-shape groove, therefore, the ring-shape groove on the stator is a one-way gas pressure flow path. The combustion chamber is also provided at the inner side wall of the stator. The combustion chamber intersects the ring-shape groove. The combustion chamber is a strip-shape slot, with a length direction thereof consistent with an axis direction of the stator. In this way, the combustion chamber can communicate with the piston chambers on the rotor which rotate along with the rotor. The arc-shape combustible gas groove and the ring-shape groove are arranged in parallel with each other, but the arc-shape combustible gas groove is in a shape of a section of minor arc. The arc-shape combustible gas groove is opposite to and communicates with the piston chambers on the rotor. The piston chambers rotate with the rotor, and when a piston chamber rotates to the arc-shape combustible gas groove, the combustible gas or other combustible gases can enter the piston chamber. The combustible gas inlet is provided on the side wall of the stator at a groove bottom of the arc-shape combustible gas groove. The combustible gas or other combustible gases enter the arc-shape combustible gas groove through the combustible gas inlet. The exhaust gas outlet correspondingly communicates with the ring-shape groove, and is located at an end away from the compression-resistant element, and between the compression-resistant element and an air inlet, and the combustion-generated gas pressure passes through the ring-shape groove and is discharged via the exhaust gas outlet.

The rotor is provided with the slider slots, the combustible gas piston chambers, and the sliding rod slots. Each sliding rod slot is a strip-shape through slot, with an axis thereof parallel to the generating line (generatrix) of the rotor, runs through two end faces of the rotor, and is located close to a central axis of the rotor, and arranged at inner sides of the slider slot and of the combustible gas piston chamber. The slider slot and the combustible gas piston chamber are arranged side by side, and both of them are located on the single generating line of the rotor, and located outside the sliding rod slot. When the rotor rotates inside the stator, all of the slider slots and the combustible gas piston chambers rotate along with the rotor. The slider slots communicate with the combustible gas piston chambers merely at the sliding rod slots. The slider slots are aligned with the ring-shape groove, and the sliders located inside the slider slots can extend into the ring-shape groove on the stator, that is, in working, the sliders continuously slide inside the slider slots and the ring-shape groove. In working, the combustible gas pistons on the rotor cooperate and communicate with the arc-shape combustible gas groove and the combustion chamber on the stator. When a combustible gas piston chamber rotates to a position where it communicates with the arc-shape combustible gas groove on the stator, the combustible gas piston chamber can communicate with the arc-shape combustible gas groove, and then the combustible gas piston chamber cooperate with the combustible gas piston, so that the combustible gas can be sucked in. When the combustible gas piston chamber rotates to a position where it communicates with the combustion chamber on the stator, the combustible gas piston chamber can communicate with the combustion chamber, and then the compressed combustible gas is fed into the combustion chamber, to be ready for combustion. The rotor further includes the gas exchange channels. Each gas exchange channel extends from the respective sliding rod slot to and runs through an outer wall of the rotor. The gas exchange channels can communicate with the ring-shape groove, and run through the rotor at a position corresponding to the ring-shape groove on the stator. The gas exchange channel is configured to balance internal and external gas pressures inside the sliding rod slots with respect to the ring-shape groove. Each sliding assembly includes the slider, the combustible gas piston, and the sliding rod. Each sliding assembly as a whole is inserted into the rotor, and slides inside the rotor in entirety. Specifically, the slider is inserted into the slider slot, the combustible gas piston is inserted into the combustible gas piston chamber, and the sliding rod is inserted into the sliding rod slot. Two ends of the sliding rod extend out of the sliding rod slot. Two ends of the stator are each provided with the stator holder. Each stator holder is provided thereon with the annular recessed variable track guide groove. The end of the sliding rod extending out of the sliding rod slot is inserted into the annular recessed variable track guide groove, such that the sliding assembly can slide along the track of the annular recessed variable track guide groove.

The stator holders are rotationally connected to the two ends of the rotor to close the two ends of the stator. The annular recessed variable track guide groove is provided on an inner side of each stator holder. Two ends of the sliding rod of each sliding assembly respectively extend into the annular recessed variable track guide grooves at corresponding ends. A moving trajectory of the sliding assembly depends upon a curve shape of the annular recessed variable track guide grooves.

For the rotary engine provided in the present disclosure, a complete operation process includes gas suction, compression, working, and exhausting.

Gas suction: after the rotor rotates, the combustible gas piston chambers are ready to suck gas. At this time, each combustible gas piston is driven by the respective sliding rod, wherein two ends of the sliding rod slide inside the annular recessed variable track guide grooves to drive the combustible gas piston to move inside the combustible gas piston chamber. When the combustible gas piston chamber rotates to the arc-shape combustible gas groove on the stator, the combustible gas piston is nearest to an opening of the combustible gas piston chamber. Meanwhile, the combustible gas enters a flow path of the arc-shape combustible gas groove through the combustible gas inlet. When the combustible gas piston chamber rotates to a position where it is capable of communicating with the arc-shape combustible gas groove, the combustible gas piston moves towards inside of the combustible gas piston chamber away from the opening, the combustible gas is sucked into the combustible gas piston chamber, and when the slider gets close to the compression-resistant element, a sufficient amount of the combustible gas has been sucked into the combustible gas piston chamber, and the combustible gas piston rotates away from the arc-shape combustible gas groove. Subsequently, the slider slot on the rotor passes by the compression-resistant element on the stator, and the slider linked with the combustible gas piston is located inside the slider slot at this time.

Compression: when the combustible gas piston chamber rotates to pass by the arc-shape combustible gas groove on the stator, the slider slot also rotates to the position of the compression-resistant element. At this time, the combustible gas piston chamber is blocked by an inner wall of the stator. Subsequently, the combustible gas piston, driven by the sliding rod, starts to slide towards the opening of the combustible gas piston chamber. The combustible gas piston starts to compress the combustible gas inside the combustible gas piston chamber. At this time, the slider also starts to extend out of the slider slot, and is inserted into the ring-shape groove on the stator.

Working: the rotor continues to rotate, so that when the combustible gas piston chamber on the rotor rotates to the combustion chamber on the stator, the already compressed combustible gas enters the combustion chamber. An ignition system is provided inside the combustion chamber, to realize ignition and combustion. Since the combustion chamber intersects and communicates with the ring-shape groove herein, the gas combusted inside the combustion chamber can enter the ring-shape groove. And since at this time a slider has been inserted into the ring-shape groove on the stator, and rotationally cooperates inside the ring-shape groove, a one-way gas pressure flow path is sealed, and a combustion-generated force pushes the slider sealing the one-way gas pressure flow path to work. The slider drives the rotor to rotate, and an output shaft is connected with the rotor, therefore, the rotary engine in the present disclosure completes the working, and power is output through the output shaft.

Exhausting: the rotor continues to rotate, so that the combustible gas piston chamber on the rotor rotates to pass by the combustion chamber on the stator, and the combustible gas combusted above continues to push the sliders inside the ring-shape groove to work. When the combustible gas combusted above flowing through the ring-shape groove is increased in volume, the working process is finished, and a gas exhausting process starts. The exhaust gas outlet is provided on the side wall of the stator and located at the ring-shape groove, and the exhaust gas obtained after finishing the working process is pushed and discharged through the exhaust gas outlet by the following sliders working alternately. After the exhausting, the sliders start to move and retract towards bottom ends of the slider slots, to get ready for next time of the above cyclic processes of gas suction, compression, combustion working, and exhausting.

A plurality of sliding assemblies are capable of simultaneously performing suction of the combustible gas, compression of the combustible gas, combustion working, and exhaust gas discharging, and performing alternate and cyclic cooperation, such that it can be ensured that there is always one slider working under stress in the one-way gas pressure flow path. The slider working under stress ends the working this time only when a following slider replaces this slider to work, and retracts to inside of the slider slot to get ready for next time of working.

On this basis, the rotary engine provided in the present disclosure can guarantee no loss of the gas pressure in the ring-shape groove, and can continuously work in an uninterrupted manner.

Based on the above object, the present disclosure further provides a rotary engine, including a stator, a rotor, and sliding assemblies, wherein the stator and the rotor are both in a tubular shape, the stator is inserted and mounted inside the rotor, the stator is rotationally connected with the rotor, and the sliding assemblies are inserted and mounted on the rotor; the stator is provided with stator holders, a ring-shape groove, a compression-resistant element, a combustion chamber, a decompression device, an arc-shape combustible gas groove, a combustible gas inlet, and an exhaust gas outlet; two ends of the stator are each fixedly connected with one stator holder, each stator holder is provided thereon with an annular recessed variable track guide groove, each annular recessed variable track guide groove extends in a closed eccentric annular shape, and the annular recessed variable track guide grooves of the two stator holders are provided corresponding to each other; the ring-shape groove is provided on an outer side wall of the stator, and the ring-shape groove is in a closed ring shape parallel to a cross section of the stator; the compression-resistant element is a block, the compression-resistant element is fixedly connected inside the ring-shape groove, and the compression-resistant element is rotationally connected to the rotor; the combustion chamber is provided at the outer side wall of the stator, and arranged to intersect the ring-shape groove at the intersected portion located at one side of the compression-resistant element; the arc-shape combustible gas groove is a groove in a shape of a section of minor arc, the arc-shape combustible gas groove is arranged parallel to the ring-shape groove, located on the outer side wall of the stator between the ring-shape groove and one of the stator holders, and located at the other side of the compression-resistant element on the outer side wall of the stator; the combustible gas inlet communicates with the arc-shape combustible gas groove, and is provided on a side wall of the stator at a groove bottom of the arc-shape combustible gas groove; the decompression device is provided on the side wall of the stator close to the combustion chamber, the decompression device communicates with the ring-shape groove from outside, and the decompression device is provided with a switch for controlling an air intake amount; the exhaust gas outlet communicates with outside at the ring-shape groove, and is provided on the side wall of the stator away from the combustion chamber; the rotor is provided with slider slots, combustible gas piston chambers, and sliding rod slots; the slider slot and the combustible gas piston chamber are provided side by side at intervals on a single generating line of the rotor; the slider slots are aligned with and communicate with the ring-shape groove; the arc-shape combustible gas groove, the arc-shape groove running through the combustion chamber, and the combustible gas piston chamber are based on a single arc (i.e. substantially on a single arc), the arc-shape combustible gas groove can communicate with the rotating combustible gas piston chambers, and the arc-shape groove running through the combustion chamber can communicate with the rotating combustible gas piston chambers; each sliding rod slot runs through the corresponding slider slot and the corresponding combustible gas piston chamber to two end faces of the rotor; the rotor further includes gas exchange channels, and each gas exchange channel extends from the bottom of the respective sliding rod slot to and runs through a side wall of the rotor corresponding to the ring-shape groove; each sliding assembly includes a slider, a combustible gas piston and a sliding rod; the slider is slidably connected inside the slider slot, the combustible gas piston is slidably connected inside the combustible gas piston chamber, and the sliding rod is slidably connected inside the sliding rod slot; the slider and the combustible gas piston are both in a flat shape, and the slider and the combustible gas piston are provided perpendicular to each other laterally, and both are fixedly connected on the sliding rod; and two ends of the sliding rod respectively extend into the annular recessed variable track guide grooves at corresponding ends, and the two ends of the sliding rod slide along the annular recessed variable track guide grooves.

Further, the stator is further provided with an arc-shape combustion-supporting air groove, wherein the arc-shape combustion-supporting air groove and the arc-shape combustible gas groove are in symmetric arrangement with respect to the ring-shape groove; the stator further includes a combustion-supporting air inlet, and the combustion-supporting air inlet communicates with the arc-shape combustion-supporting air groove; the rotor is provided thereon with combustion-supporting air piston chambers, the arc-shape combustion-supporting air groove is capable of communicating with the rotating combustion-supporting air piston chamber, and the arc-shape groove running through the combustion chamber is capable of communicating with the rotating combustion-supporting air piston chamber; the combustion-supporting air piston chamber and the combustible gas piston chamber are symmetric with respect to the slider slot, the sliding rod slot runs through the combustion-supporting air piston chamber; the sliding assembly further includes a combustion-supporting air piston, where the combustion-supporting air piston is in a flat shape, the combustion-supporting air piston is provided inside the combustion-supporting air piston chamber and fixedly connected on the slider slot, and the combustion-supporting air piston is provided parallel to the combustible gas piston; the combustion-supporting air piston is slidably connected inside the combustion-supporting air piston chamber. The arc-shape combustion-supporting air groove and the combustion-supporting air piston chamber are provided to supply more air to the combustion chamber for supporting the combustion.

Optionally, a bracket is further included, where the bracket is fixedly connected on a side wall of the rotor corresponding to the ring-shape groove, and the bracket is rotationally connected with the compression-resistant element; the bracket is an annular plate, and the bracket is parallel to a cross section of the rotor; and the slider slots extend to run through the bracket, the bracket is located inside the ring-shape groove, and correspondingly, a recess for accommodating the bracket is required to be provided on the compression-resistant element, such that the rotor can rotate normally. The bracket is configured to support the slider working under stress.

Optionally, the rotary engine is provided with an ignition system, and the ignition system is provided inside the combustion chamber.

Optionally, a water inlet is further included, the water inlet is provided close to the combustion chamber, and the water inlet communicates with the ring-shape groove.

Optionally, six combustible gas piston chambers and six combustion-supporting air piston chambers are provided, and correspondingly six sliding assembly is provided.

Optionally, the stator is provided with a decompression device, the decompression device communicates with the ring-shape groove, and the decompression device is provided with a switch for controlling an air intake amount.

Optionally, the decompression device is provided on the side wall of the stator close to the combustion chamber, and the decompression device communicates with the ring-shape groove from outside.

Optionally, two brackets are provided.

Optionally, the stator holders are rotationally connected to the two ends of the rotor to close the two ends of the stator; the annular recessed variable track guide groove is provided on an inner side of each stator holder, two ends of the sliding rod of the sliding assembly respectively extend into the annular recessed variable track guide grooves at corresponding ends; and a moving trajectory of the sliding assembly depends on a curve shape of the annular recessed variable track guide groove.

A power output method, based on the above rotary engine, has a complete cycle, including gas suction, compression, working, and exhausting.

Optionally, a moving trajectory of the sliding assembly depends upon a curve shape of the annular recessed variable track guide groove; the shape of annular recessed variable track guide groove changes, in a radial direction of the compression-resistant element, from a ring shape to an eccentric annular shape deviating by protruding in a direction away from the stator, wherein the annular recessed variable track guide groove is eccentric to such an extent that the sliding rod is able to be driven to make the slider completely slide into the slider slot and successfully pass by the compression-resistant element.

For the rotary engine provided in the present disclosure, on the basis of the above working principle, relative positions of the rotor and the stator can be exchanged, that is, it also may be the case that the rotor is provided outside, and the stator is provided inside. In this case, the stator is hollowed in the center, that is, the stator is in a tubular shape, with a hollow portion thereof being capable of communicating with the outside for gas inlet and gas outlet. On this basis, compared with original technologies, the present disclosure has advantages such as large torsion, uniform output, and little noise.

BRIEF DESCRIPTION OF DRAWINGS

In order to more clearly illustrate technical solutions in embodiments of the present disclosure or in the prior art, accompanying drawings which are needed for description of the embodiments or the prior art will be introduced briefly below. Apparently, the accompanying drawings in the description below merely show some embodiments of the present disclosure. Those ordinarily skilled in the art still could obtain other accompanying drawings in light of these accompanying drawings, without paying inventive effort.

Figure 1:
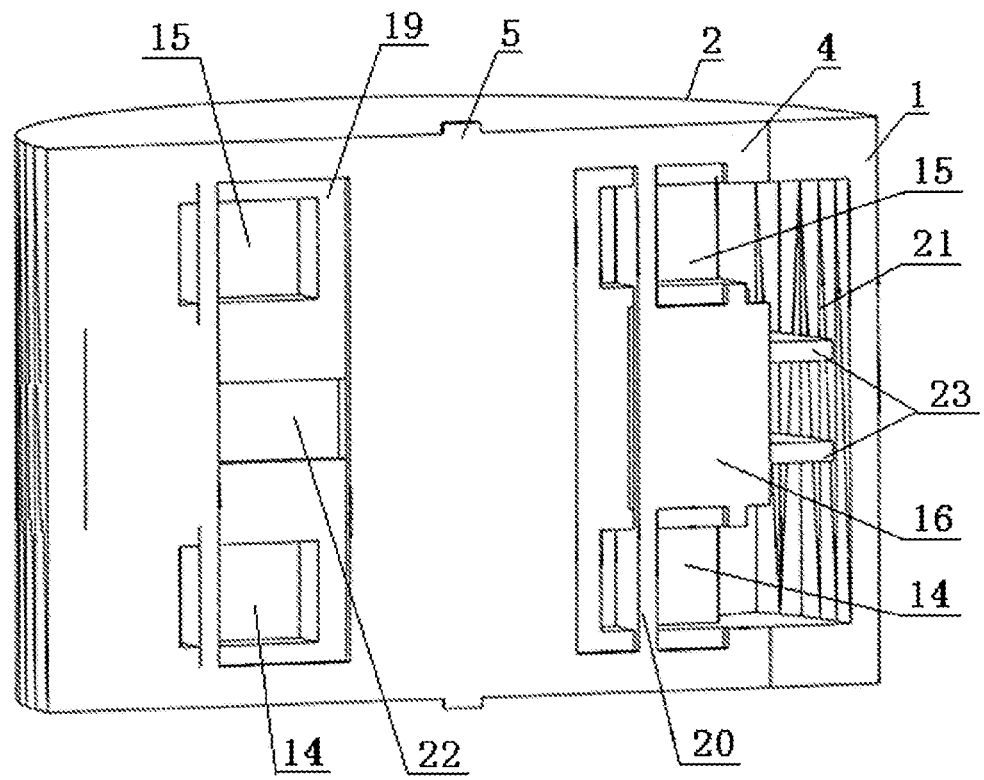
FIG. 1 is a longitudinal sectional view according to Embodiment 1 of the present disclosure.
Figure 2:
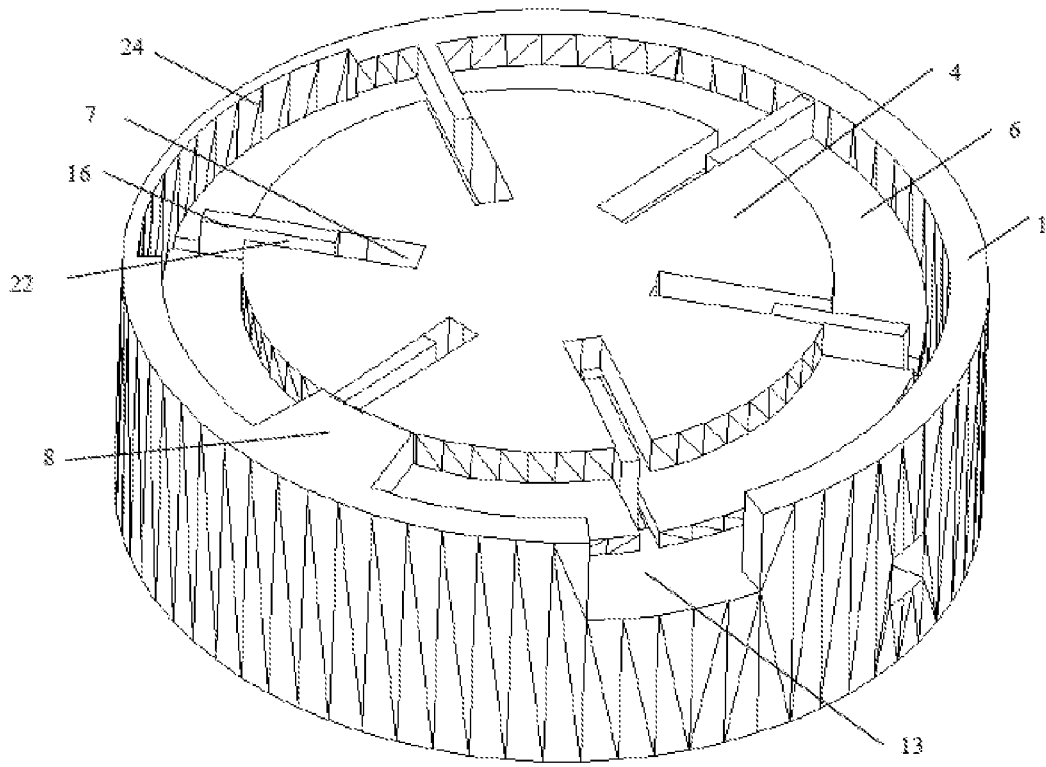
FIG. 2 is a horizontal sectional view, at a ring-shape groove, according to Embodiment 1 of the present disclosure.
Figure 3:
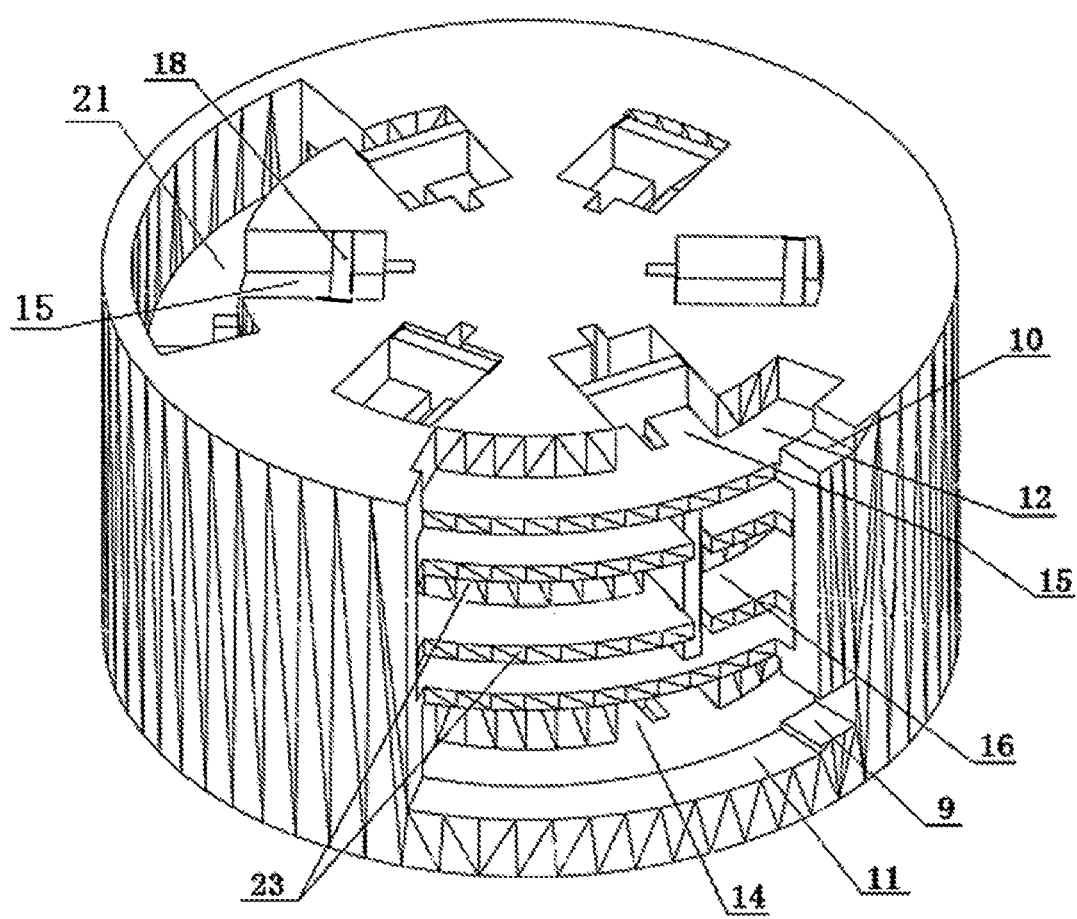
FIG. 3 is a horizontal sectional view, at an arc-shape combustible gas groove, according to Embodiment 1 of the present disclosure.
Figure 4:
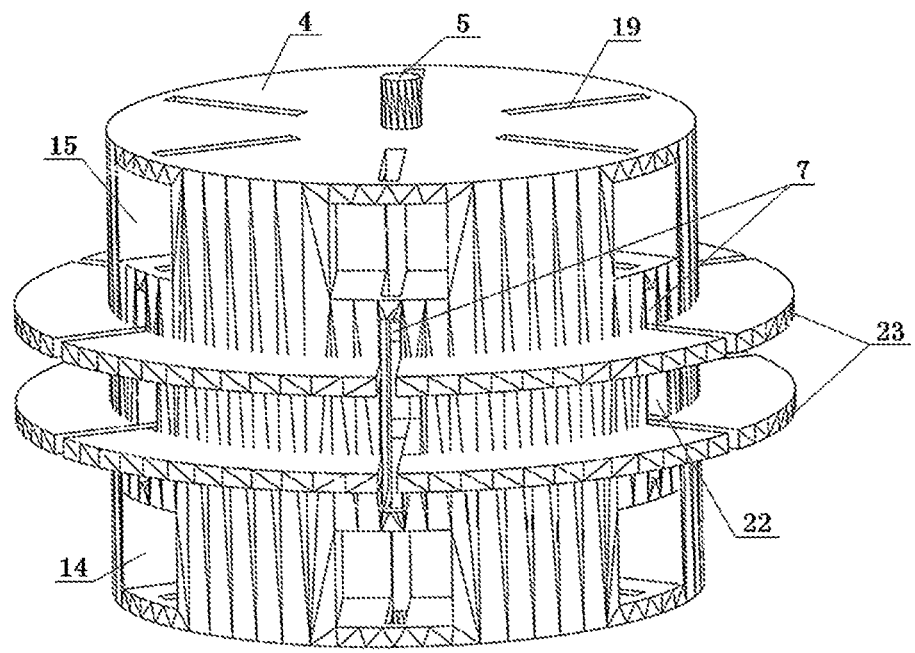
FIG. 4 is a schematic diagram of a rotor according to Embodiment 1 of the present disclosure.
Figure 5:
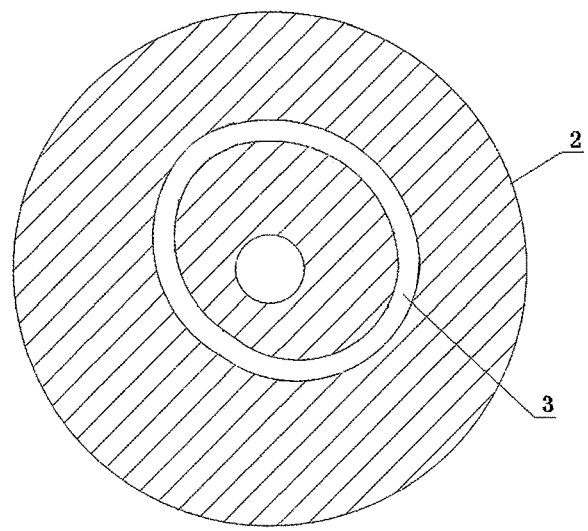
FIG. 5 is a structural schematic diagram of an annular recessed variable track guide groove according to Embodiment 1 of the present disclosure.
Figure 6:
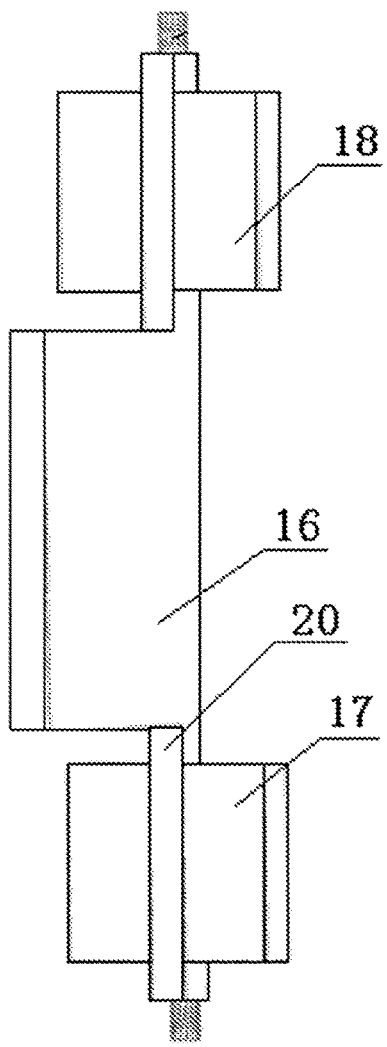
FIG. 6 is a structural schematic diagram of a sliding assembly according to the present disclosure.
Figure 7:
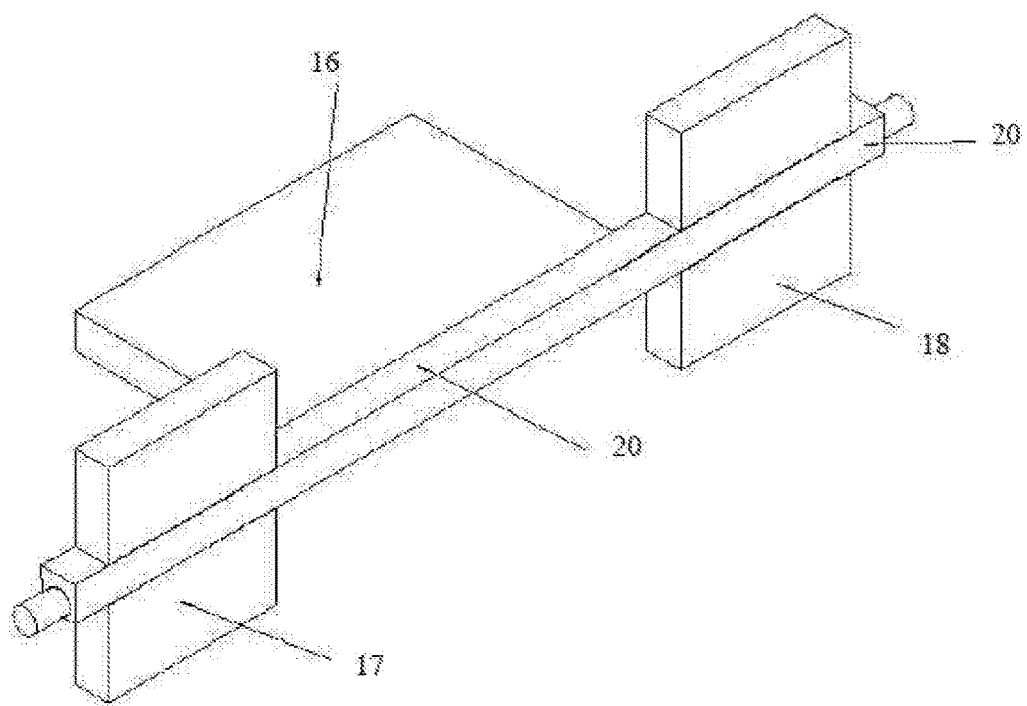
FIG. 7 is a structural schematic diagram of the sliding assembly, from another angle, according to the present disclosure.

Reference signs: 1-stator; 2-stator holder; 3-annular recessed variable track guide groove; 4-rotor; 5-rotor shaft; 6-ring-shape groove; 7-slider slot; 8-compression-resistant element; 9-combustion-supporting air inlet; 10-combustible gas inlet; 11-arc-shape combustion-supporting air groove; 12-arc-shape combustible gas groove; 13-exhaust gas outlet; 14-combustion-supporting air piston chamber; 15-combustible gas piston chamber; 16-slider; 17-combustion-supporting air piston; 18-combustible gas piston; 19-sliding rod slot; 20-sliding rod; 21-combustion chamber; 22-gas exchange channel; 23-bracket; 24-water inlet.

DETAILED DESCRIPTION OF EMBODIMENTS

Technical solutions of the present disclosure will be described clearly and comprehensively below with reference to accompanying drawings. Apparently, the described embodiments are only some embodiments of the present disclosure, rather than all embodiments. All of other embodiments obtained by those ordinarily skilled in the art based on the embodiments in the present disclosure without any inventive efforts shall fall into the scope of protection of the present disclosure.

In the description of the present disclosure, it should be indicated that orientational or positional relationships indicated by terms such as "center", "upper", "lower", "left", "right", "vertical", "horizontal", "inner", and "outer" are based on orientational or positional relationships as shown in the accompanying drawings, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying importance in relativity.

In the description of the present disclosure, it should be indicated that unless otherwise specified and defined explicitly, terms "mount", "join", and "connect" should be construed in a broad sense, for example, it may be fixed connection, detachable connection, or integral connection; it may be mechanical connection, and also may be electrical connection; it may be direct connection, indirect connection through an intermediate medium, or inner communication between two elements. For those ordinarily skilled in the art, specific meanings of the above-mentioned terms in the present disclosure can be understood according to specific circumstances.

Embodiment 1

As shown in FIG. 1 to FIG. 7, a rotary engine is provided in the present embodiment. The rotary engine includes a stator 1, a rotor 4, and sliding assemblies. The stator 1 is in a tubular shape. The rotor 4 is in a cylindrical shape. The rotor 4 is inserted and mounted inside the stator 1. The rotor 4 is rotationally connected to the stator 1. The sliding assemblies are inserted and mounted on the rotor 4. The stator 1 is provided thereon with stator holders 2, a ring-shape groove 6, a compression-resistant element 8, a combustion chamber 21, a decompression device, an arc-shape combustible gas groove 12, a combustible gas inlet 10, and an exhaust gas outlet 13. Two ends of the stator 1 are each fixedly connected with one stator holder 2. Each stator holder 2 is provided thereon with an annular recessed variable track guide groove 3. Each annular recessed variable track guide groove 3 extends in a closed eccentric annular shape. The annular recessed variable track guide grooves 3 of the two stator holders 2 are provided corresponding to each other. The ring-shape groove 6 is provided on an inner side wall of the stator 1, and the ring-shape groove 6 is in a closed ring shape parallel to a cross section of the stator 1. The compression-resistant element 8 is a block. The compression-resistant element is fixedly connected inside the ring-shape groove 6. The compression-resistant element 8 is rotationally connected to the rotor 4. The combustion chamber 21 is provided on the inner side wall of the stator 1, and provided to intersect the ring-shape groove 6 at the intersected portion located at one side of the compression-resistant element 8. The arc-shape combustible gas groove 12 is a groove in a shape of a section of minor arc. The arc-shape combustible gas groove 12 is arranged parallel to the ring-shape groove 6, located on the inner side wall of the stator between the ring-shape groove 6 and one of the stator holders 2, and located at the other side of the compression-resistant element 8 away from the combustion chamber. The combustible gas inlet 10 communicates with the arc-shape combustible gas groove 12, and is located on the side wall of the stator 1 at a groove bottom of the arc-shape combustible gas groove 12. The exhaust gas outlet 13 communicates with the outside at the ring-shape groove 6, and is provided on the side wall of the stator 1 away from the combustion chamber 21. The rotor 4 is provided with slider slots 7, combustible gas piston chambers 15 and sliding rod slots 19. The sliding rod slots 19 are arranged close to a central axis of the rotor 4. The slider slots 7 and the combustible gas piston chambers 15 are provided side by side at intervals on a single generating line of the rotor 4. The slider slots 7 are aligned with and communicate with the ring-shape groove 6. The arc-shape combustible gas groove 12 can communicate with the rotating combustible gas piston chambers 15, and the arc-shape groove running through the combustion chamber 21 can communicate with the rotating combustible gas piston chambers 15. Each sliding rod slot 19 runs through the corresponding slider slot 7 and the corresponding combustible gas piston chamber 15 to two end faces of the rotor 4. The rotor 4 further includes gas exchange channels 22, and each gas exchange channel 22 extends from the bottom of the corresponding sliding rod slot 19 to and runs through a side wall of the rotor 4 corresponding to the ring-shape groove 6. Each sliding assembly includes a slider 16, a combustible gas piston 18 and a sliding rod 20. The slider 16 is slidably connected inside the slider slot 7. The combustible gas piston 18 is slidably connected inside the combustible gas piston chamber 15. The sliding rod 20 is slidably connected inside the sliding rod slot 19. The slider 16 and the combustible gas piston 18 are both in a flat shape, and the slider 16 and the combustible gas piston 18 are provided perpendicularly to each other laterally, and both are fixedly connected on the sliding rod 20. Two ends of the sliding rod 20 respectively extend into the annular recessed variable track guide grooves 3 at corresponding ends. The two ends of the sliding rod 20 slide along the annular recessed variable track guide grooves 3.

Further, each stator holder 2 is provided with an axle hole. Two ends of the rotor 4 are each provided with a rotor shaft 5. Each rotor shaft 5 is rotationally connected with the axle hole on the corresponding stator holder 2.

The rotary engine provided in the present disclosure includes the stator, the rotor, and the sliding assemblies, wherein the stator is fixed relative to a rack, the rotor rotates inside the stator, and the sliding assemblies slide on the rotor. Since the stator is rotationally connected with the rotor, all grooves on the stator corresponding to the rotor form combustible gas channels. The sliding assemblies are utilized to work, that is, the sliding assemblies slide inside the rotor, in the meantime, the sliding assemblies rotate along with the rotor.

The inner side wall of the stator is provided with the ring-shape groove parallel to the cross section of the stator and located in a middle portion of the stator. In working, the sliders extend into the ring-shape groove. The compression-resistant element is fixedly connected inside the ring-shape groove, to cut off the groove originally in closed ring shape. The slider in each sliding assembly, when rotating to the position of the compression-resistant element, abuts against the compression-resistant element, and is rotationally connected with the compression-resistant element. The ring-shape groove is a channel for combustible gas, the compression-resistant element provided on the ring-shape groove is rotationally connected with the rotor to block an gas pressure, and the combustion-generated gas pressure can only pass through the exhaust gas outlet and be discharged through the ring-shape groove, therefore, the ring-shape groove on the stator is a one-way gas pressure flow path. The combustion chamber is also provided on the inner side wall of the stator. The combustion chamber intersects the ring-shape groove. The combustion chamber is a strip-shape slot, with a length direction thereof consistent with an axis direction of the stator. In this way, the combustion chamber can communicate with the piston chambers on the rotor.

The arc-shape combustible gas groove and the ring-shape groove are arranged in parallel with each other, but the arc-shape combustible gas groove is in a shape of a section of minor arc. The arc-shape combustible gas groove is opposite to and communicates with the piston chambers on the rotor. The piston chambers rotate along with the rotor, and when a piston chamber rotates to the arc-shape combustible gas groove, a combustible gas or other combustible gases can enter the piston chamber. The combustible gas inlet is provided on the side wall of the stator at a groove bottom of the arc-shape combustible gas groove. The combustible gas or other combustible gases enter the arc-shape combustible gas groove through the combustible gas inlet. The exhaust gas outlet correspondingly communicates with the ring-shape groove, and is located at an end away from the compression-resistant element and between the compression-resistant element and an air inlet. The combustion-generated gas pressure is discharged via the exhaust gas outlet through the ring-shape groove.

The rotor is provided thereon with the slider slots, the combustible gas piston chambers and the sliding rod slots. Each sliding rod slot is a strip-shape through slot, with an axis thereof parallel to the generating line of the rotor, runs through two end faces of the rotor, and is located close to a central axis of the rotor, and arranged at inner sides of the slider slot and of the combustible gas piston chamber. The slider slot and the combustible gas piston chamber are arranged side by side, and both of them are located on the single generating line of the rotor, and located outside the sliding rod slot. When the rotor rotates inside the stator, all of the slider slots and the combustible gas piston chambers rotate along with the rotor. The slider slots communicate with the combustible gas piston chambers merely at the sliding rod slots. The slider slots are aligned with the ring-shape groove, and the sliders located inside the slider slots can extend into the ring-shape groove on the stator, that is, in working, the sliders continuously slide inside the slider slots and the ring-shape groove. In working, the combustible gas pistons on the rotor cooperate and communicate with the arc-shape combustible gas groove and the combustion chamber on the stator. When a combustible gas piston chamber rotates to a position where it communicates with the arc-shape combustible gas groove on the stator, the combustible gas piston chamber can communicate with the arc-shape combustible gas groove, and then the combustible gas piston chamber cooperate with the combustible gas piston, so that the combustible gas can be sucked in. When the combustible gas piston chamber rotates to a position where it communicates with the combustion chamber on the stator, the combustible gas piston chamber can communicate with the combustion chamber, and then the already compressed combustible gas is fed into the combustion chamber, to be ready for combustion.

The rotor further includes the gas exchange channels. Each gas exchange channel extends from the respective sliding rod slot to and runs through an outer wall of the rotor. The gas exchange channels can communicate with the ring-shape groove, and run through the rotor at a position corresponding to the ring-shape groove on the stator. The gas exchange channel is configured to balance a gas pressure inside the sliding rod slots, and relieve a pressure difference generated by movement of the sliding rods inside the sliding rod slots.

Each sliding assembly includes the slider, the combustible gas piston, and the sliding rod. Each sliding assembly as a whole is inserted into the rotor, and slides inside the rotor in entirety. Specifically, the slider is inserted into the slider slot, the combustible gas piston is inserted into the combustible gas piston chamber, and the sliding rod is inserted into the sliding rod slot. Two ends of the sliding rod extend out of the sliding rod slot. Two ends of the stator are each provided with the stator holder. Each stator holder is provided with the annular recessed variable track guide groove. The end of the sliding rod extending out of the sliding rod slot is inserted into the annular recessed variable track guide groove, such that the sliding assembly can slide along the track of the annular recessed variable track guide groove.

The stator holders are rotationally connected to the two ends of the rotor to close the two ends of the stator. The annular recessed variable track guide groove is provided on an inner side of each stator holder. Two ends of the sliding rod of each sliding assembly respectively extend into the annular recessed variable track guide grooves at corresponding ends. A moving trajectory of the sliding assembly depends upon a curve shape of the annular recessed variable track guide grooves.

For the rotary engine provided in the present disclosure, a complete operation process includes gas suction, compression, working, and exhausting.

Gas suction: after the rotor rotates, the combustible gas piston chambers are ready to suck gas. At this time, each combustible gas piston is driven by the respective sliding rod to slide inside the annular recessed variable track guide grooves, such that the combustible gas piston moves towards the bottom portion of the combustible gas piston chamber. When the combustible gas piston chamber rotates to the arc-shape combustible gas groove on the stator, the combustible gas piston is located at the very bottom of the combustible gas piston chamber. Meanwhile, the combustible gas enters a flow path of the arc-shape combustible gas groove through the combustible gas inlet. When the combustible gas piston chamber rotates to a position where it is capable of communicating with the arc-shape combustible gas groove, the combustible gas is sucked into the combustible gas piston chamber. In the above process, when the slider slot on the rotor passes by the position of the compression-resistant element on the stator, the slider connected with the combustible gas piston is located inside the slider slot.

Compression: when the combustible gas piston chamber rotates to pass by the arc-shape combustible gas groove on the stator, the slider slot also rotates to the position of the compression-resistant element. At this time, the combustible gas piston chamber is blocked by the inner wall of the stator. Subsequently, the combustible gas piston, driven by the sliding rod, starts to slide towards an opening of the combustible gas piston chamber. The combustible gas piston starts to compress the combustible gas inside the combustible gas piston chamber. At this time, the slider also starts to extend out of the slider slot, and extends into the ring-shape groove on the stator.

Working: the rotor continues to rotate, so that when the combustible gas piston chamber on the rotor rotates to the combustion chamber on the stator, the already compressed combustible gas enters the combustion chamber. An ignition system is provided inside the combustion chamber, to realize combustion. Since the combustion chamber intersects the ring-shape groove herein, the combustible gas combusted inside the combustion chamber can enter the ring-shape groove. And since the slider at this time also extends into the ring-shape groove on the stator, a combustion-generated force pushes the slider to work. The slider drives the rotor to rotate, and an output shaft is connected with the rotor, therefore, the rotary engine in the present disclosure completes the working, and power is output through the output shaft.

Exhausting: the rotor continues to rotate, so that the combustible gas piston chamber on the rotor rotates to pass by the combustion chamber on the stator, and the combustible gas combusted above continues to push the sliders inside the ring-shape groove to work. When the combustible gas combusted above flowing through the ring-shape groove is increased in volume, the working process is finished, and a gas exhausting process starts. The exhaust gas outlet is provided on the side wall of the stator, and located at the ring-shape groove, and the exhaust gas obtained after the working process is finished is discharged through the exhaust gas outlet. In the process from working to gas exhausting, the sliders slowly move from openings located at the slider slots towards bottom ends of the slider slots. After the gas exhausting, the sliders start to dramatically move towards the bottom ends of the slider slots, to get ready for a next cycle of gas suction, compression, combustion working, and gas exhausting.

A plurality of sliding assemblies can simultaneously perform suction of the combustible gas, compression of the combustible gas, combustion working, and exhaust gas discharging, and perform alternate and cyclic cooperation, therefore, it can be ensured that there is always one slider working under stress in the one-way gas pressure flow path. The slider working under stress ends the current working only when a following slider replaces this slider, and subsequently, the slider retracts to inside of the slider slot to get ready for next time of working.

It should be indicated that the moving trajectory of each sliding assembly depends upon the curve shape of the annular recessed variable track guide groove 3. The annular recessed variable track guide groove changes, in a radial direction of the compression-resistant element, from a ring shape to an eccentric annular shape deviating by protruding in a direction away from the stator, wherein the annular recessed variable track guide groove is eccentric to such an extent that the sliding rod can be driven to bring the slider to completely slide into the slider slot and successfully pass by the compression-resistant element.

In an optional solution of the present embodiment, six combustible gas piston chambers 15 and six combustion-supporting air piston chambers 14 are provided, and correspondingly six sliding assembly are provided.

In an optional solution of the present embodiment, the stator is provided with a decompression device. The decompression device communicates with the ring-shape groove. The decompression device is provided with a switch for controlling an air intake amount. The decompression device is provided on the stator at the ring-shape groove, and configured to adjust the gas pressure inside the combustion chamber.

In an optional solution of the present embodiment, the stator 1 further includes an arc-shape combustion-supporting air groove 11, and the arc-shape combustion-supporting air groove 11 and the arc-shape combustible gas groove 12 are in symmetric arrangement with respect to the ring-shape groove 6; the stator 1 further includes a combustion-supporting air inlet 9, and the combustion-supporting air inlet 9 communicates with the arc-shape combustion-supporting air groove 11;

the rotor 4 is provided thereon with combustion-supporting air piston chambers 14, the arc-shape combustion-supporting air groove 11 can communicate with a rotating combustion-supporting air piston chamber 14, and the arc-shape groove running through the combustion chamber 21 can communicate with the rotating combustion-supporting air piston chamber 14; the combustion-supporting air piston chamber 14 and the combustible gas piston chamber 15 are symmetric with respect to the slider slots 7, the sliding rod slot 19 passes through the combustion-supporting air piston chamber 14; each sliding assembly further includes a combustion-supporting air piston 17, wherein the combustion-supporting air piston 17 is in a flat shape, the combustion-supporting air piston 17 is provided inside the combustion-supporting air piston chamber 14, and fixedly connected on the slider slot 20, the combustion-supporting air piston 17 is provided parallel to the combustible gas piston 18, and the sliders 16 are provided at intervals between the combustion-supporting air piston 17 and the combustible gas piston 18; the flat-shape combustion-supporting air piston 17 is slidably connected inside the combustion-supporting air piston chamber 14.

In an optional solution of the present embodiment, a bracket 23 is further included. The bracket 23 is fixedly connected on the side wall of the rotor 4 corresponding to the ring-shape groove 6. The bracket 23 is rotationally connected with the compression-resistant element 8. The bracket 23 is an annular plate. The bracket 23 is parallel to a cross section of the rotor 4. The slider slots 7 extend to run through an outer circumferential surface of the bracket 23. The bracket 23 is located inside the ring-shape groove 6, and correspondingly, a recess for accommodating the bracket 23 is provided on the compression-resistant element 8, such that the rotor 4 can rotate normally. Most preferably, two brackets 23 are provided.

In an optional solution of the present embodiment, the rotary engine is provided with an ignition system, and the ignition system is provided inside the combustion chamber 21.

In an optional solution of the present embodiment, a water inlet 24 is further included, and the water inlet 24 is provided on a wall face of the ring-shape groove 6 close to the combustion chamber 21.

Embodiment 2

Figure 8:
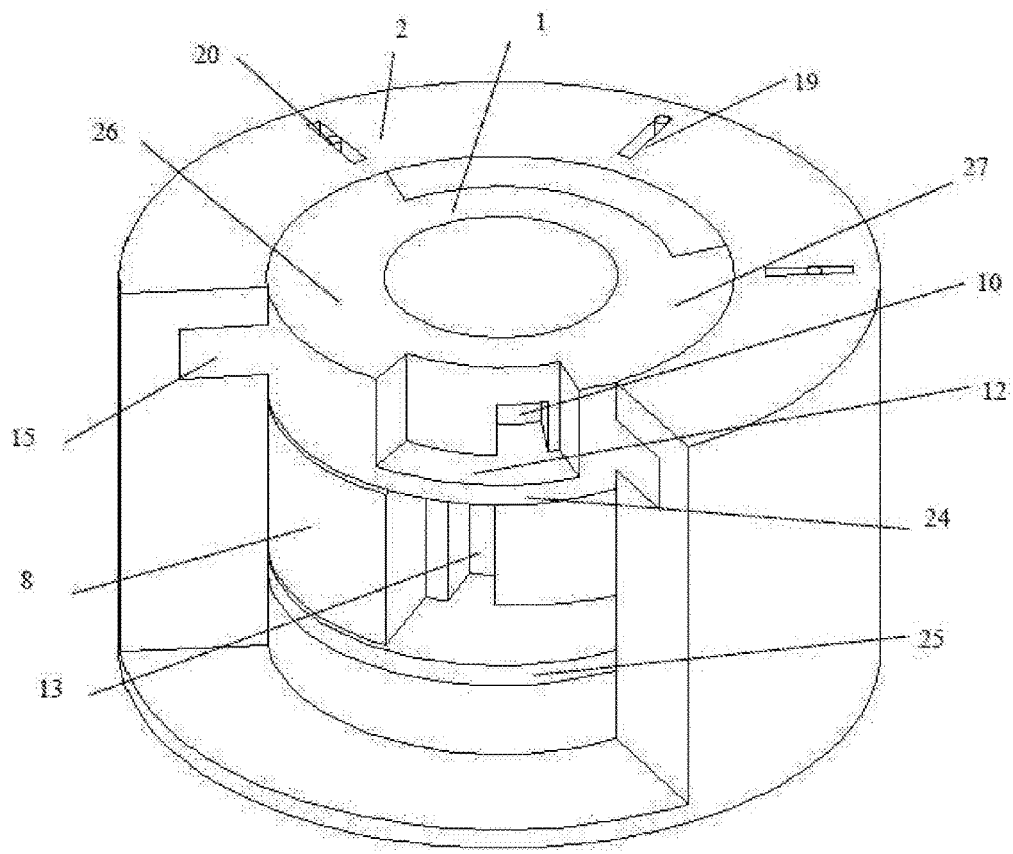
FIG. 8 is a partial longitudinal sectional view according to Embodiment 2 of the present disclosure.

FIG. 8 shows a rotary engine provided in another embodiment of the present disclosure. The rotary engine provided in the present embodiment is obtained by further improving the rotary engine provided in Embodiment 1. The technical solution described in Embodiment 1 also belongs to this embodiment, and the technical solution already described in Embodiment 1 will not be repeatedly described.

Specifically, as shown in FIG. 8, the present embodiment provides a rotary engine, including a stator 1, a rotor 4, and sliding assemblies. The stator 1 and the rotor 4 are both in a tubular shape. The stator 1 is inserted and mounted inside the rotor 4. The stator 1 is rotationally connected with the rotor 4. The sliding assemblies are inserted and mounted on the rotor 4.

The stator 1 is provided with stator holders 2, a ring-shape groove 6, a compression-resistant element 8, a combustion chamber 21, a decompression device, an arc-shape combustible gas groove 12, a combustible gas inlet 10, and an exhaust gas outlet 13.

Two ends of the stator 1 are each fixedly connected with one stator holder 2, each stator holder 2 is provided thereon with an annular recessed variable track guide groove 3, the annular recessed variable track guide groove 3 extends in a closed eccentric annular shape, and the annular recessed variable track guide grooves 3 of the two stator holders 2 are provided corresponding to each other.

The ring-shape groove 6 is located on an outer side wall of the stator 1, and the ring-shape groove 6 is in a closed ring shape parallel to a cross section of the stator 1.

The compression-resistant element 8 is a block, the compression-resistant element is fixedly connected inside the ring-shape groove 6, and the compression-resistant element 8 is rotationally connected to the rotor 4.

The combustion chamber 21 is provided on an outer side wall of the stator 1 and arranged to intersect the ring-shape groove 6 at the intersected portion located at one side of the compression-resistant element 8.

The arc-shape combustible gas groove 12 is a groove in a shape of a section of minor arc, the arc-shape combustible gas groove 12 is arranged parallel to the ring-shape groove 6, located on the outer side wall of the stator between the ring-shape groove 6 and one of the stator holders 2, and located at the other side of the compression-resistant element 8 away from the combustion chamber.

The combustible gas inlet 10 communicates with the arc-shape combustible gas groove 12, and is located on the side wall of the stator 1 at a groove bottom of the arc-shape combustible gas groove 12; the decompression device is provided on the side wall of the stator 1 close to the combustion chamber 21, communicates with the ring-shape groove 6 from outside, and is provided with a switch for controlling an air intake amount.

The exhaust gas outlet 13 communicates with the outside at the ring-shape groove 6, and is located on the side wall of the stator 1 away from the combustion chamber 21.

The rotor 4 is provided thereon with slider slots 7, combustible gas piston chambers 15 and sliding rod slots 19; the slider slots 7 are aligned with and communicate with the ring-shape groove 6; the arc-shape combustible gas groove 12 can communicate with the rotating combustible gas piston chamber 15, and the arc-shape groove running through the combustion chamber 21 can communicate with the rotating combustible gas piston chamber 15; the slider slots 7 and the combustible gas piston chambers 15 are provided side by side at intervals on a single generating line of the rotor 4; and the sliding rod slots 19 run through the slider slots 7 and the combustible gas piston chambers 15 to two end faces of the rotor 4.

The rotor 4 further includes gas exchange channels 22, and each gas exchange channel 22 extends from the bottom of the respective sliding rod slot 19 to and runs through a side wall of the rotor 4 corresponding to the ring-shape groove 6.

Each sliding assembly includes a slider 16, a combustible gas piston 18, and a sliding rod 20; the slider 16 is slidably connected inside the slider slot 7, the combustible gas piston 18 is slidably connected inside the combustible gas piston chamber 15, and the sliding rod 20 is slidably connected inside the sliding rod slot 19; the slider 16 and the combustible gas piston 18 are both in a flat shape, and the slider 16 and the combustible gas piston 18 are provided perpendicular to each other laterally, and both are fixedly connected to the sliding rod 20; two ends of the sliding rod 20 respectively extend into the annular recessed variable track guide grooves 3 at corresponding ends, and the two ends of the sliding rod 20 slide along the annular recessed variable track guide grooves 3.

Embodiment 3

Figure 9:
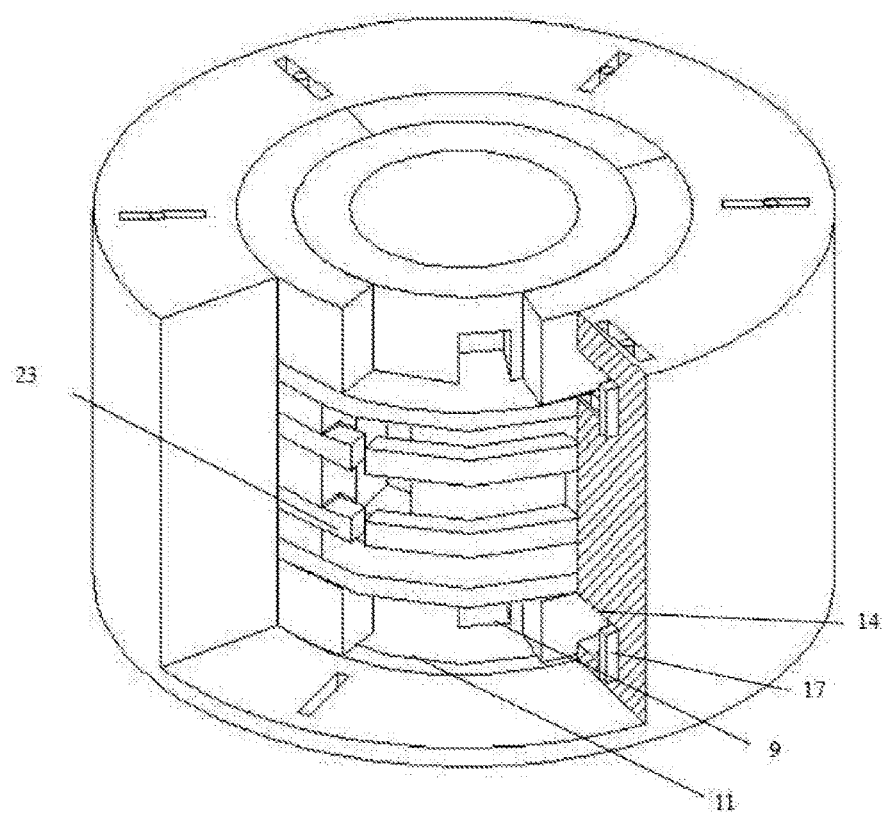
FIG. 9 is a partial longitudinal sectional view according to Embodiment 3 of the present disclosure.
Figure 10:
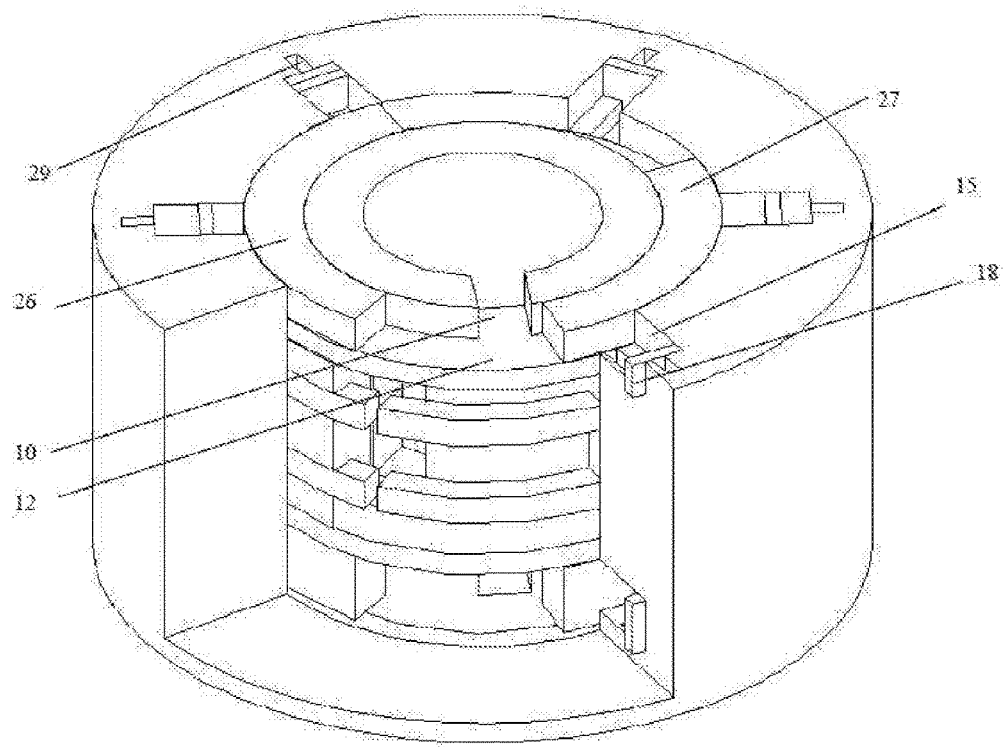
FIG. 10 is a horizontal sectional view, at the arc-shape combustible gas groove, according to Embodiment 3 of the present disclosure.
Figure 11:
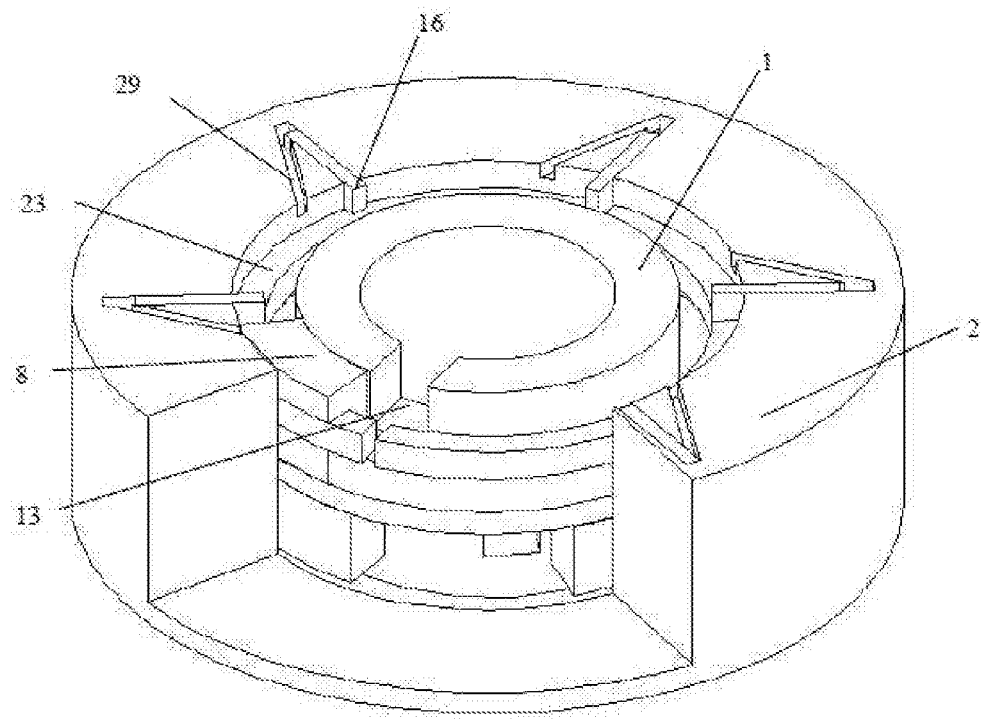
FIG. 11 is a horizontal sectional view, at a ring-shape groove, according to Embodiment 3 of the present disclosure.
Figure 12:
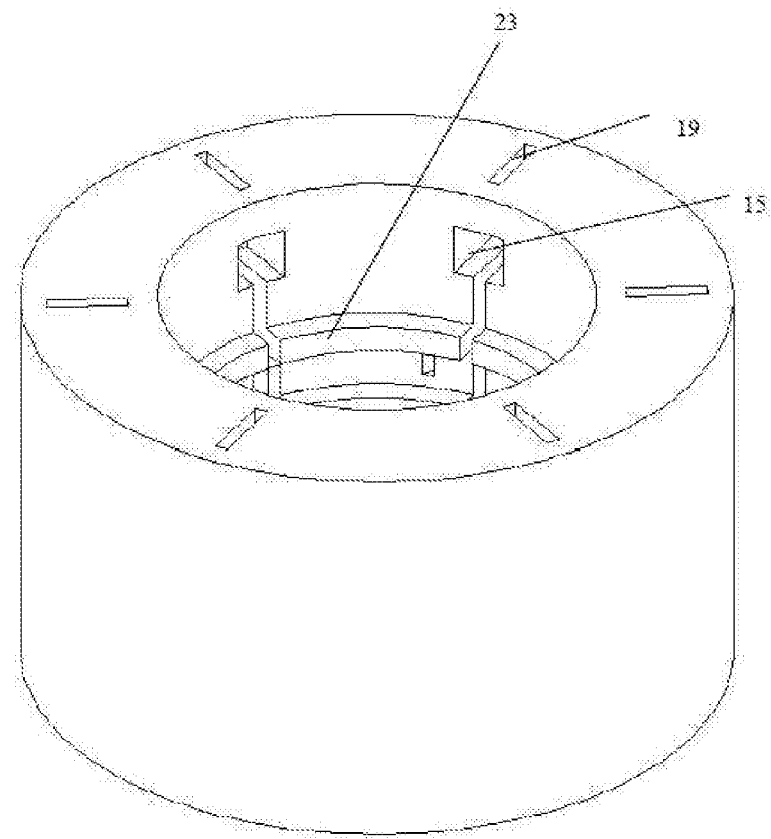
FIG. 12 is a structural schematic diagram of the rotor according to Embodiment 2 and Embodiment 3 of the present disclosure.
Figure 13:
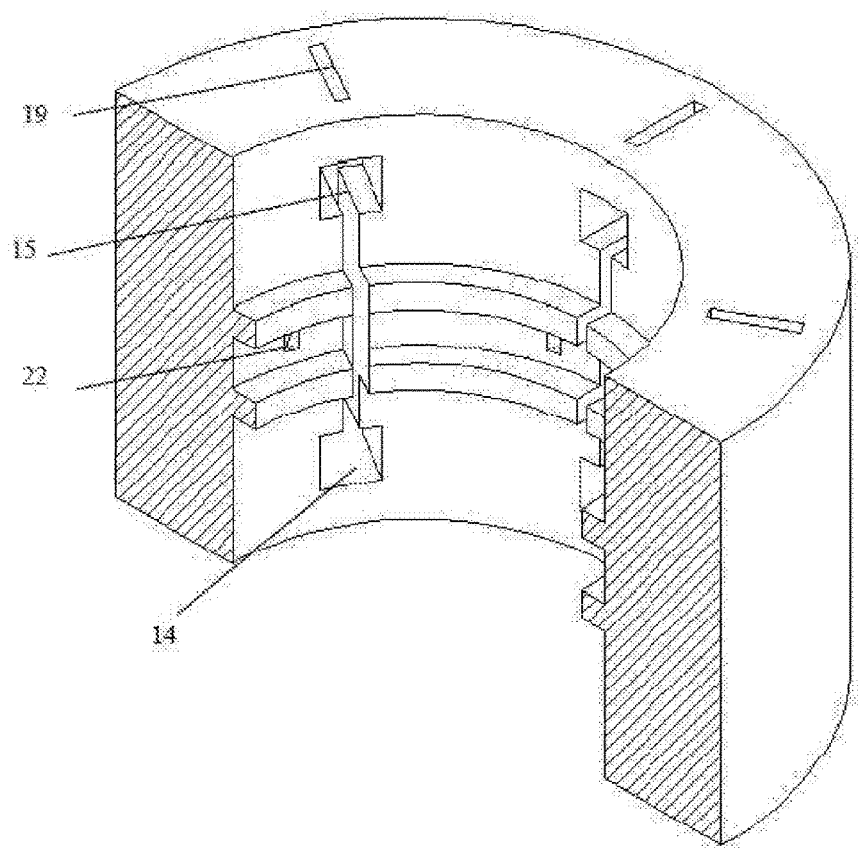
FIG. 13 is a longitudinal sectional view of the rotor according to Embodiment 2 and Embodiment 3 of the present disclosure.
Figure 14:
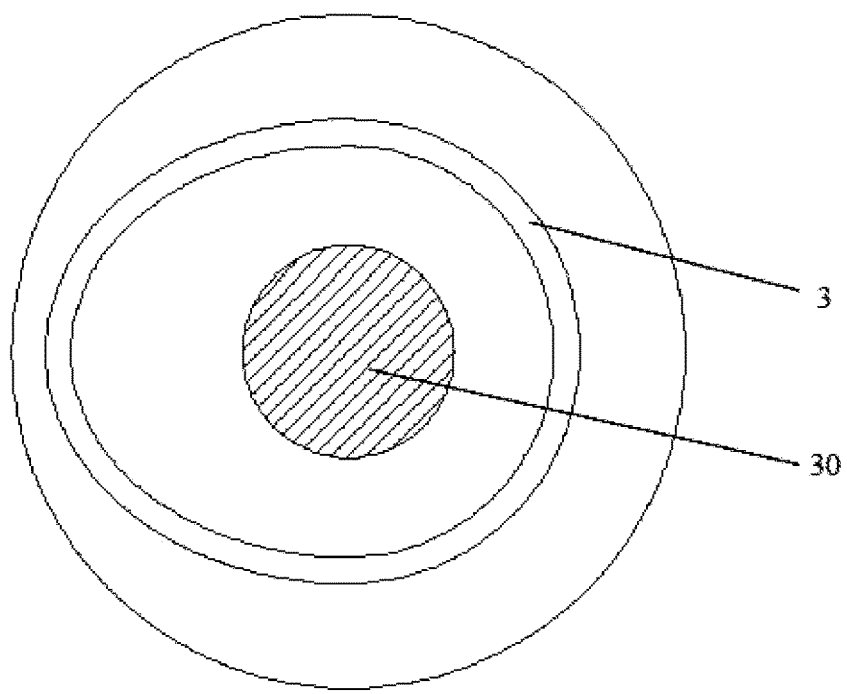
FIG. 14 is a schematic diagram of the annular recessed variable track guide groove according to Embodiment 2 and Embodiment 3 of the present disclosure.

FIG. 9 to FIG. 14 show a rotary engine provided in a further embodiment of the present disclosure. As shown in FIG. 9, the rotary engine provided in the present embodiment is obtained by further improving the rotary engine provided in Embodiment 2. The technical solution described in Embodiment 2 also belongs to this embodiment, and the technical solution already described in Embodiment 2 will not be repeatedly described.

Specifically, as shown in FIG. 9 to FIG. 14, the present embodiment provides a rotary engine. The stator 1 further includes an arc-shape combustion-supporting air grooves 11, wherein the arc-shape combustion-supporting air groove 11 and the arc-shape combustible gas groove 12 are in symmetric arrangement with respect to the ring-shape groove 6; the stator 1 further includes a combustion-supporting air inlet 9, and the combustion-supporting air inlet 9 communicates with the arc-shape combustion-supporting air groove 11; the rotor 4 is provided thereon with combustion-supporting air piston chambers 14, the combustion-supporting air piston chambers 14 are provided corresponding to the respective slider slots 7, the arc-shape combustion-supporting air groove 11 can communicate with the rotating combustion-supporting air piston chamber 14, and the arc-shape groove running through the combustion chamber 21 can communicate with the rotating combustion-supporting air piston chamber 14; the combustion-supporting air piston chamber 14 and the combustible gas piston chamber 15 are symmetric with respect to the slider slot 7, and the sliding rod slot 19 runs through the combustion-supporting air piston chamber 14; each sliding assembly further includes a combustion-supporting air piston 17, wherein the combustion-supporting air piston 17 is in a flat shape, and the combustion-supporting air piston 17 is provided inside the combustion-supporting air piston chamber 14, and fixedly connected on the sliding rod 20; the flat-shape combustion-supporting air piston 17 is slidably connected inside the combustion-supporting air piston chamber 14.

The rotary engine provided in the present disclosure has the following beneficial effects: a plurality of sliding assemblies are provided to perform alternate and cyclic cooperation, in which the gas pressure generated by internal combustion continuously acts perpendicularly on the sliders successively extending into the one-way gas pressure flow path inside the rotating rotor, to make the sliders continuously work under stress. Since there is always a slider blocking the one-way gas pressure flow path constantly, the combustion-generated gas pressure is always blocked by the working slider in the one-way gas pressure flow path, without loss, that is, it only needs to ensure energy efficiency of the combustion, while it is unnecessary to choose timing for the combustion. In the working process, suction and storage of the combustible gas, compression and transportation of the combustible gas, combustion, working under stress, and gas exhausting are simultaneously performed. According to the above working stroke, a working stroke of rotating and then circulating can be realized, and working efficiency can be improved. In the operation process, since the combustible gas is naturally sucked and stored, compressed and transported and the exhaust gas is naturally discharged, a little noise is generated.

When the present disclosure is used to drive a vehicle, in a normal operation state with high temperature and high pressure generated by combustion, a suitable amount of water, which is taken as a carrier, is sprayed in sequence through the water inlet with combustion rhythm in the one-way gas pressure flow path with high temperature and high pressure, and when encountering high temperature, the sprayed water is vaporized instantly, which not only increases a gas amount and the gas pressure and improves the working efficiency, but also decreases a mechanical temperature of the engine, optimizes the mechanical temperature environment, thus realizing optimization and improvement.

The vehicle using the present disclosure has advantages of stable operation, large torsion, uniform output, and little noise. Besides, when going downhill, no fuel needs to be supplied, and no combustion needs to be started, while all that is needed is to start the decompression device to control a flow rate of air entering the one-way gas pressure flow path for controlling the traveling speed of the vehicle.

Finally, it should be indicated that various embodiments above are merely used for illustrating the technical solutions of the present disclosure, rather than limiting the present disclosure. While the detailed description is made to the present disclosure with reference to the preceding embodiments, those ordinarily skilled in the art should understand that they still can modify the technical solutions recited in the preceding various embodiments, or make equivalent substitutions to some or all of the technical features therein, and these modifications or substitutions do not make the corresponding technical solutions essentially depart from the scope of the technical solutions of the various embodiments of the present disclosure.

INDUSTRIAL APPLICABILITY

The rotary engine provided in the present disclosure has the following beneficial effects: a plurality of sliding assemblies are provided to perform alternate and cyclic cooperation, in which the gas pressure generated by internal combustion continuously acts perpendicularly on the sliders successively extending into the one-way gas pressure flow path inside the rotating rotor, to make the sliders continuously work under stress, and since there is always a slider blocking the one-way gas pressure flow path constantly, the combustion-generated gas pressure is always blocked by the working slider in the one-way gas pressure flow path without loss, that is, it only needs to ensure energy efficiency of the combustion, while it is unnecessary to choose timing for the combustion. In the working process, suction and storage of the combustible gas, compression and transportation of the combustible gas, combustion, working under stress, and gas exhausting are simultaneously performed. According to the above working stroke, the working stroke of rotating and then circulating can be realized, and the working efficiency can be improved. In the operation process, since the combustible gas is naturally sucked and stored, compressed and transported, and the exhaust gas is naturally discharged, a little noise is generated. When the present disclosure is used to drive a vehicle, in a normal operation state with high temperature and high pressure generated by combustion, a suitable amount of water, which is taken as a carrier, is sprayed in sequence through the water inlet with combustion rhythm in the one-way gas pressure flow path with high temperature and high pressure, and when encountering high temperature, the sprayed water is vaporized instantly, which not only increases the gas amount and the gas pressure and improves the working efficiency, but also decreases the mechanical temperature of the engine, optimizes the mechanical temperature environment, thus realizing optimization and improvement. The vehicle using the present disclosure has the advantages of stable operation, large torsion, uniform output, and little noise. Besides, when going downhill, no fuel needs to be supplied, and no combustion needs to be started, while all that is needed is to start the decompression device to control the flow rate of air entering the one-way gas pressure flow path for controlling the traveling speed of the vehicle.

What is claimed is:

1. A rotary engine, comprising:
a stator,
a rotor, and
sliding assemblies,
wherein the stator is in a tubular shape, the rotor is in a cylindrical shape, the rotor is inserted and mounted in the stator, the rotor is rotationally connected to the stator, and the sliding assemblies are inserted and mounted on the rotor;
the stator is provided with stator holders, a ring-shape groove, a compression-resistant element, a combustion chamber, an arc-shape combustible gas groove, a combustible gas inlet, and an exhaust gas outlet;
two ends of the stator are each fixedly connected with one stator holder, each stator holder is provided thereon with an annular recessed variable track guide groove, each annular recessed variable track guide groove extends in a closed eccentric annular shape, and the annular recessed variable track guide grooves of the two stator holders are parallel and opposite to each other;
the ring-shape groove is provided on an inner side wall of the stator, and the ring-shape groove is a groove in a closed ring shape parallel to a cross section of the stator;
the compression-resistant element is a block, the compression-resistant element is fixedly connected inside the ring-shape groove, and the compression-resistant element is rotationally connected to the rotor;
the combustion chamber is provided at the inner side wall of the stator, and intersects the ring-shape groove at one side of the compression-resistant element;

the arc-shape combustible gas groove is a groove in a shape of a section of minor arc, and the arc-shape combustible gas groove is arranged parallel to the ring-shape groove, located on the inner side wall of the stator between the ring-shape groove and one of the stator holders, and located at other side of the compression-resistant element away from the combustion chamber;

the combustible gas inlet communicates with the arc-shape combustible gas groove, and is provided on a side wall of the stator at a groove bottom of the arc-shape combustible gas groove;

the exhaust gas outlet is provided on the side wall of the stator, and communicates with the ring-shape groove;

the rotor is provided with slider slots, combustible gas piston chambers, and sliding rod slots;

each sliding rod slot is a strip-shape slot, running through two ends of the rotor and arranged close to a central axis of the rotor, all of the slider slots and the combustible gas piston chambers are located outside the sliding rod slots, and communicate with the sliding rod slots, the slider slots are aligned with the ring-shape groove, the combustible gas piston chambers are configured to rotate with rotation of the rotor, so as to be able to communicate with the arc-shape combustible gas groove and the combustion chamber;

the rotor further comprises gas exchange channels, and each gas exchange channel extends from a bottom of the respective sliding rod slot to and runs through an outer wall of the rotor at a position where the gas exchange channel communicates with the ring-shape groove; and each sliding assembly comprises a slider, a combustible gas piston and a sliding rod, wherein the slider is slidably connected inside the respective slider slot, the combustible gas piston is slidably connected inside the respective combustible gas piston chamber, the sliding rod is slidably connected inside the respective sliding rod slot, the slider and the combustible gas piston are both in a flat shape, the slider and the combustible gas piston are provided perpendicular to each other, and both are fixedly connected on the sliding rod, and two ends of the sliding rod respectively extend into the annular recessed variable track guide grooves at corresponding ends, so that the two ends of the sliding rod are able to slide along the annular recessed variable track guide grooves.

2. The rotary engine according to claim 1, wherein each stator holder is provided with an axle hole, two ends of the rotor are each provided with a rotor shaft, and each rotor shaft is rotationally connected with the axle hole of the corresponding stator holder.

3. The rotary engine according to claim 1, wherein the stator further comprises an arc-shape combustion-supporting air groove, the arc-shape combustion-supporting air groove and the arc-shape combustible gas groove are in symmetric arrangement with respect to the ring-shape groove, the stator further comprises a combustion-supporting air inlet, and the combustion-supporting air inlet communicates with outside at the arc-shape combustion-supporting air groove; and the rotor is provided with a combustion-supporting air piston chamber, the arc-shape combustion-supporting air groove is able to communicate with the combustion-supporting air piston chamber which is rotating, the arc-shape groove running through the combustion chamber is able to communicate with the rotating combustion-supporting air piston chamber, the combustion-supporting air piston chamber and the combustible gas piston chamber are symmetric with respect to the slider slots, the sliding rod slot runs through the combustion-supporting air piston chamber, the sliding assembly further comprises a combustion-supporting air piston, wherein the combustion-supporting air piston is in a flat shape, the combustion-supporting air piston is provided inside the combustion-supporting air piston chamber and fixedly connected on the slider slot, the combustion-supporting air piston is provided parallel to the combustible gas piston, and the combustion-supporting air piston is slidably connected inside the combustion-supporting air piston chamber.

4. The rotary engine according to claim 1, wherein the rotary engine is provided with an ignition system, and the ignition system is provided inside the combustion chamber.

5. The rotary engine according to claims 1, further comprising a water inlet, wherein the water inlet is provided close to the combustion chamber, and the water inlet communicates with the ring-shape groove.

6. The rotary engine according to claims 1, wherein six combustible gas piston chambers and six combustion-supporting air piston chambers are provided, and six sliding assemblies are correspondingly provided.

7. The rotary engine according to claim 1, wherein the stator holders are rotationally connected to the two ends of the rotor to close the two ends of the stator, and each annular recessed variable track guide groove is provided at an inner side of the respective stator holder, two ends of the sliding rod of the sliding assembly respectively extend into the annular recessed variable track guide grooves at corresponding ends, and a moving trajectory of the sliding assembly depends upon a curve shape of the annular recessed variable track guide groove.

8. The rotary engine according to claim 1, further comprising a bracket, wherein the bracket is fixedly connected on a side wall of the rotor corresponding to the ring-shape groove, the bracket is rotationally connected with the compression-resistant element, the bracket is an annular plate, the bracket is parallel to a cross section of the rotor, the slider slots extend through the bracket, and the bracket is located inside the ring-shape groove.

9. The rotary engine according to claim 8, wherein two brackets are provided.

10. A power output method, wherein the power output method is applicable to the rotary engine of claim 1, and a complete cycle of the power output method comprises:

gas suction, compression, working, and gas exhausting,
gas suction: after the rotor rotates, the combustible gas piston chambers are ready to suck gas, at this time, each combustible gas piston is driven by the respective sliding rod, two ends of the sliding rod slide inside the annular recessed variable track guide grooves to drive the combustible gas piston to move inside the combustible gas piston chamber;

the combustible gas piston chamber rotates to the arc-shape combustible gas groove on the stator, and is nearest to an opening of the combustible gas piston chamber, meanwhile, a combustible gas enters a flow path of the arc-shape combustible gas groove through the combustible gas inlet;

the combustible gas piston chamber continues to rotate to a position where the combustible gas piston chamber is able to communicate with the arc-shape combustible gas groove, and moves towards inside of the combustible gas piston chamber away from the opening, so that the combustible gas is sucked into the combustible gas piston chamber, and the slider gets close to the compression-resistant element, at this time, a sufficient amount of the combustible gas is in the combustible gas piston chamber, and the combustible gas piston rotates away from the arc-shape combustible gas groove, subsequently, the slider slot on the rotor passes by the compression-resistant element on the stator, and at this time the slider linked with the combustible gas piston is located inside the slider slot;

compression: the combustible gas piston chamber rotates to pass by the arc-shape combustible gas groove on the stator, at this time, the slider slot also rotates to pass by the compression-resistant element, at this time, the combustible gas piston chamber is blocked by an inner wall of the stator, subsequently, the combustible gas piston, driven by the sliding rod, starts to slide towards the opening of the combustible gas piston chamber, the combustible gas piston starts to compress the combustible gas inside the combustible gas piston chamber, and at this time, the slider also starts to extend out of the slider slot and extends into the ring-shape groove on the stator;

working: the rotor continues to rotate, so that the combustible gas piston chamber on the rotor rotates to the combustion chamber on the stator, and the compressed combustible gas enters the combustion chamber; an ignition system is provided inside the combustion chamber, to realize ignition and combustion; since the combustion chamber intersects and communicates with the ring-shape groove here, a combustible gas combusted inside the combustion chamber enters the ring-shape groove, and since a slider at this time is inserted into the ring-shape groove on the stator and rotationally cooperate with the ring-shape groove, a one-way gas pressure flow path is sealed, and a combustion-generated force pushes the slider sealing the one-way gas pressure flow path to work, wherein the slider drives the rotor to rotate, and an output shaft is connected with the rotor, thus completing working of the rotary engine of the present disclosure, and outputting power through the output shaft; and gas exhausting: the rotor continues to rotate, so that the combustible gas piston chamber on the rotor rotates to pass by the combustion chamber on the stator, and the combustible gas combusted continues to push the sliders inside the ring-shape groove to work; a volume of the combustible gas combusted flowing through the ring-shape groove is increased, then a working process is finished, and the gas exhausting starts, wherein the exhaust gas outlet is provided on the side wall of the stator and located at the ring-shape groove, and exhaust gas obtained after finishing the working process is discharged through the exhaust gas outlet by the following sliders working alternately; and after the gas exhausting, the sliders start to move and retract towards bottom ends of the slider slots, to get ready for next time of the above cyclic process of gas suction, compression, combustion working and gas exhaust.

11. The power output method according to claim 10, wherein a plurality of sliding assemblies are able to simultaneously perform suction of the combustible gas, compression of the combustible gas, combustion working and exhaust gas discharging, and perform alternate and cyclic cooperation, so as to ensure that there is always one slider working under stress in the one-way gas pressure flow path; and the slider working under stress ends the current working only when a following slider replaces the slider working under stress to work, and retracts to inside of the slider slot to get ready for next time of working.

12. The power output method according to claim 10, wherein a moving trajectory of the sliding assembly depends upon a curve shape of the annular recessed variable track guide groove, and the annular recessed variable track guide grooves changes, in a radial direction of the compression-resistant element, from a ring shape to an eccentric annular shape deviating by protruding in a direction away from the stator, wherein the annular recessed variable track guide groove is eccentric to such an extent that the sliding rod is able to be driven to make the slider completely slide into the slider slot and successfully pass by the compression-resistant element.

13. A rotary engine, comprising:
a stator,
a rotor, and
sliding assemblies,
wherein the stator and the rotor are both in a tubular shape, the stator is inserted and mounted in the rotor, the stator is rotationally connected with the rotor, and the sliding assemblies are inserted and mounted on the rotor;

the stator is provided with stator holders, a ring-shape groove, a compression-resistant element, a combustion chamber, an arc-shape combustible gas groove, a combustible gas inlet, and an exhaust gas outlet;

two ends of the stator are each fixedly connected with one stator holder, each stator holder is provided with an annular recessed variable track guide groove, each annular recessed variable track guide groove extends in a closed eccentric annular shape, and the annular recessed variable track guide grooves of the two stator holders are provided corresponding to each other;

the ring-shape groove is provided on an outer side wall of the stator, and the ring-shape groove is in a closed ring shape parallel to a cross section of the stator;

the compression-resistant element is a block, the compression-resistant element is fixedly connected inside the ring-shape groove, and the compression-resistant element is rotationally connected to the rotor;

the combustion chamber is provided at the outer side wall of the stator, and arranged to intersect the ring-shape groove at an intersected portion located at one side of the compression-resistant element;

the arc-shape combustible gas groove is a groove in a shape of a section of minor arc, and the arc-shape combustible gas groove is arranged parallel to the ring-shape groove, located on the outer side wall of the stator between the ring-shape groove and one of the stator holders, and located at the other side of the compression-resistant element away from the combustion chamber;

the combustible gas inlet communicates with the arc-shape combustible gas groove, and is located on a side wall of the stator at a groove bottom of the arc-shape combustible gas groove;

the exhaust gas outlet is provided on the side wall of the stator, and communicates with the ring-shape groove, and the rotor is provided with slider slots, combustible gas piston chambers and sliding rod slots;

each sliding rod slot is a strip-shape slot, running through two ends of the rotor and arranged close to a central axis of the rotor, all of the slider slots and the combustible gas piston chambers are located outside the sliding rod slots and communicate with the sliding rod slots, the slider slots are aligned with the ring-shape groove, the combustible gas piston chambers are configured to rotate with rotation of the rotor, so as to be able to communicate with the arc-shape combustible gas groove and the combustion chamber;

the rotor further comprises gas exchange channels, and each gas exchange channel extends from a bottom of the respective sliding rod slot to and runs through an outer wall of the rotor at a position where the gas exchange channel communicates with the ring-shape groove; and each sliding assembly comprises a slider, a combustible gas piston and a sliding rod, wherein the slider is slidably connected inside the respective slider slot, the combustible gas piston is slidably connected inside the respective combustible gas piston chamber, the sliding rod is slidably connected inside the respective sliding rod slot, the slider and the combustible gas piston are both in a flat shape, the slider and the combustible gas piston are provided perpendicular to each other laterally, and both are fixedly connected on the sliding rod, and two ends of the sliding rod respectively extend into the annular recessed variable track guide grooves at corresponding ends, so that the two ends of the sliding rod are able to slide along the annular recessed variable track guide grooves.

14. The rotary engine according to claim 13, wherein the stator further comprises an arc-shape combustion-supporting air groove, the arc-shape combustion-supporting air groove and the arc-shape combustible gas groove are in symmetric arrangement with respect to the ring-shape groove, the stator further comprises a combustion-supporting air inlet, and the combustion-supporting air inlet communicates with outside at the arc-shape combustion-supporting air groove; and the rotor is provided with a combustion-supporting air piston chamber, the arc-shape combustion-supporting air groove is able to communicate with the combustion-supporting air piston chamber which is rotating, the arc-shape groove running through the combustion chamber is able to communicate with the rotating combustion-supporting air piston chamber, the combustion-supporting air piston chamber and the combustible gas piston chamber are symmetric with respect to the slider slots, the sliding rod slot runs through the combustion-supporting air piston chamber, the sliding assembly further comprises a combustion-supporting air piston, wherein the combustion-supporting air piston is in a flat shape, the combustion-supporting air piston is provided inside the combustion-supporting air piston chamber and fixedly connected on the slider slot, the combustion-supporting air piston is provided parallel to the combustible gas piston, and the combustion-supporting air piston is slidably connected inside the combustion-supporting air piston chamber.

15. The rotary engine according to claim 13, further comprising a bracket, wherein the bracket is fixedly connected on a side wall of the rotor corresponding to the ring-shape groove, the bracket is rotationally connected with the compression-resistant element, the bracket is an annular plate, the bracket is parallel to a cross section of the rotor, the slider slots extend through the bracket, and the bracket is located inside the ring-shape groove.

16. The rotary engine according to of claim 13, wherein the stator holders are rotationally connected to the two ends of the rotor to close the two ends of the stator, and each annular recessed variable track guide groove is provided at an inner side of the respective stator holder, two ends of the sliding rod of the sliding assembly respectively extend into the annular recessed variable track guide grooves at corresponding ends, and a moving trajectory of the sliding assembly depends upon a curve shape of the annular recessed variable track guide groove.

* * * * *

UNITED STATES PATENT AND TRADEMARK OFFICE
CERTIFICATE OF CORRECTION

PATENT NO. : 10,774,735 B2
APPLICATION NO. : 16/326231
DATED : September 15, 2020
INVENTOR(S) : Yihong Tang et al.

Page 1 of 1

It is certified that error appears in the above-identified patent and that said Letters Patent is hereby corrected as shown below:

In the Claims

In Claim 5 and Claim 6, wording, "claims 1" (Column 20, Line 18) and "claims 1" (Column 20, Line 22) should be "claim 1" and "claim 1," respectively.

Signed and Sealed this
Twentieth Day of October, 2020

Andrei Iancu
*Director of the United States Patent and Trademark Office*